United States Patent
Carbonini

(10) Patent No.: US 8,156,858 B2
(45) Date of Patent: Apr. 17, 2012

(54) APPARATUS FOR THE REGULATION OF OPERATION PARAMETERS, IN PARTICULAR PRESSURE, FOR A COFFEE MACHINE, MACHINE AND OPERATING METHOD THEREFOR

(75) Inventor: Carlo Carbonini, Villastanza di Parabiago (IT)

(73) Assignee: Rancilio Macchine per Caffe' S.p.A., Milan (IT)

( * ) Notice: Subject to any disclaimer, the term of this patent is extended or adjusted under 35 U.S.C. 154(b) by 508 days.

(21) Appl. No.: 12/304,880

(22) PCT Filed: Jun. 13, 2007

(86) PCT No.: PCT/IB2007/052235
§ 371 (c)(1),
(2), (4) Date: Dec. 15, 2008

(87) PCT Pub. No.: WO2007/144833
PCT Pub. Date: Dec. 21, 2007

(65) Prior Publication Data
US 2009/0205502 A1  Aug. 20, 2009

(30) Foreign Application Priority Data
Jun. 15, 2006 (EP) .................................... 06425405

(51) Int. Cl.
*A47J 31/00* (2006.01)
(52) U.S. Cl. ............... 99/280; 99/281; 99/282; 426/433
(58) Field of Classification Search .................... 99/280, 99/281, 282; 426/433
See application file for complete search history.

(56) References Cited

U.S. PATENT DOCUMENTS

| | | | | |
|---|---|---|---|---|
| 5,375,508 | A * | 12/1994 | Knepler et al. | 99/280 |
| 6,164,189 | A * | 12/2000 | Anson | 99/281 |
| 7,631,593 | B2 * | 12/2009 | Lassota et al. | 99/280 |
| 2004/0031395 | A1 * | 2/2004 | Wroblewski | 99/281 |
| 2004/0261624 | A1 * | 12/2004 | Lassota | 99/280 |
| 2006/0021515 | A1 | 2/2006 | Graviss et al. | |
| 2006/0278092 | A1 * | 12/2006 | Lyall | 99/279 |
| 2008/0121109 | A1 * | 5/2008 | Nicolai | 99/281 |
| 2010/0154645 | A1 * | 6/2010 | Nosler et al. | 99/281 |

FOREIGN PATENT DOCUMENTS

| | | |
|---|---|---|
| DE | 100 35 181 C1 | 12/2001 |
| EP | 0328705 A1 | 8/1989 |
| EP | 0 472 272 A2 | 2/1992 |
| EP | 1 645 215 A1 | 4/2006 |
| WO | 2004/036509 A2 | 4/2004 |
| WO | 2005/081081 A1 | 9/2005 |

* cited by examiner

*Primary Examiner* — Reginald L Alexander
(74) *Attorney, Agent, or Firm* — Sughrue Mion, PLLC

(57) ABSTRACT

The present invention relates to an apparatus for the regulation of operation parameters, in particular pressure, in a coffee machine. The apparatus comprises a keyboard, arranged for activating the machine and setting operation parameters, and a plurality of light or sound emitting elements arranged to be selectively activated for highlight through a plurality of configurations the operation parameters of the machine set through the keyboard. Thanks to the invention it is possible to avoid on the machine the presence of a display that makes more complex and less reliable the machine. The invention relates also to a machine that comprises the apparatus and to the operating method of the apparatus.

14 Claims, 2 Drawing Sheets

ABSTRACT FOR THE REGULATION OF OPERATION PARAMETERS, IN PARTICULAR PRESSURE, FOR A COFFEE MACHINE, MACHINE AND OPERATING METHOD THEREFOR

CROSS REFERENCE TO RELATED APPLICATION

This application is a National Stage of International Application No. PCT/IB2007/052235 filed Jun. 13, 2007, claiming priority based on European Patent Application No. 06425405.5, filed Jun. 15, 2006, the contents of all of which are incorporated herein by reference in their entirety.

TECHNICAL FIELD

The present invention relates, in general, to an apparatus for the regulation of operation parameters of a coffee machine, to the machine that comprises the apparatus and to the apparatus operating method.

In particular, the present invention relates to an apparatus for regulating the boiler pressure of an espresso coffee machine.

BACKGROUND ART

Machines for preparing coffee, in particular espresso coffee, are known in the art.

Such machines are usually divided in traditional machines and super-automatic machines.

Traditional machines comprise, for instance, machines that in any case require the presence of an operator and in turn, they are conventionally divided in semiautomatic machines and automatic machines.

Semiautomatic machines comprise machines in which the dosage of ground coffee is measured by means of external measuring devices and the espresso coffee supply is controlled by the operator by means of a machine key.

Automatic machines comprise machines in which the dosage of ground coffee is measured by means of external measuring devices and the supply is activated by the operator by means of suitable keys in which each key corresponds, for instance, to a type of coffee to be supplied.

Super-automatic machines conventionally comprise machines in which it is provided that the dosage of ground coffee and the supply are controlled by the machines, whereby they may be activated by an operator or a user.

A super-automatic machine for the preparation of espresso coffee is known from the publication EP_0472272A2; this machine comprises a boiler, means for distributing beverages and microprocessor means for controlling both machine operations, such as beverages distribution, and operation parameters setting, such as the amount of water dispensed per each beverage, the water temperature in the boiler, etc.

Such a background art provides that, for controlling machine operations and, in particular, operation parameters setting, the machine comprises a plurality of push-buttons and a display unit arranged to display, for instance, the operation parameters that have been set.

Similarly, an automatic type traditional machine is known from U.S. Pat. No. 5,072,660, said machine providing a plurality of push-buttons and a display unit for controlling and displaying, respectively, machine operations and operation parameters setting.

The Applicant has found that, typically, background art documents provide that, for controlling operation parameters of a coffee machine by means of a microprocessor, the presence is necessary both of a push-button device (keyboard) and of a numeric or alphanumeric visualisation device (display).

The presence of both such devices and in particular of the display involves, in Applicant opinion, a plurality of problems.

First of all, the display, unlike the keyboard, is an electronic device responsive to high temperatures and to humidity and, therefore, it must be placed so as not to be close to heat sources and to be protected from humidity; such a solution is not always easy to realise in a coffee machine, in particular if the machine is of the traditional type.

Secondly, the display position must be such to allow an operator or a user to see the displayed information.

Thirdly the displayed information, in order to be intelligible by the operator or user, must be in the operator's or user's language; such a requirement imposes the necessity to associate to the microprocessor enough additional memory to store the information to be displayed on the display in several languages, and this necessarily involves high manufacturing costs.

In summary the Applicant has found that the presence of additional devices, such as the display and the additional memory, besides involving greater malfunctioning risks, impose both higher design costs, as it is necessary to arrange the display with utmost precision, and higher manufacturing costs, because, as a matter of fact, it is necessary to provide for the presence of additional devices.

DISCLOSURE OF THE INVENTION

Object of the present invention is an apparatus and a coffee machine that solve the prior art problems outlined above in a simple and effective way.

According to the present invention, such object is achieved by means of an apparatus for the regulation of operation parameters, in particular pressure, in an espresso coffee machine, as claimed.

The present invention relates also to a coffee machine that comprises the apparatus according to the invention, to an operating method for the apparatus as well as to a computer program product loadable in the memory of at least one computer and including software code portions for performing said method when the product is stored in the memory of at least one computer.

Claims are an integral part of the teaching of the present invention.

According to a preferred embodiment the apparatus according to the present invention comprises a plurality of light emitting elements actuatable according to predetermined configurations corresponding each to an operation parameter chosen among a plurality of operation parameters.

According to a further feature of the present invention, the apparatus is configured for lightening at least one first light emitting element in fixed way and a second light emitting element in fixed or blinking way as a function of the value of the operation parameter chosen among a plurality of operation parameters.

According to still another feature of the present invention, the apparatus comprises activation means configured for activating devices directed to the management of the operation parameters in the machine and is configured for making at least one light emitting element flash during activation of the activation means.

BRIEF DESCRIPTION OF DRAWINGS

These and further features and advantages of the present invention will appear more clearly from the following detailed description of preferred embodiments, provided by way of non-limiting examples with reference to the attached drawings, in which components designated by same or similar reference numerals indicate components having same or similar functionality and construction and wherein.

BEST MODE FOR CARRYING OUT THE INVENTION

Figure 1:
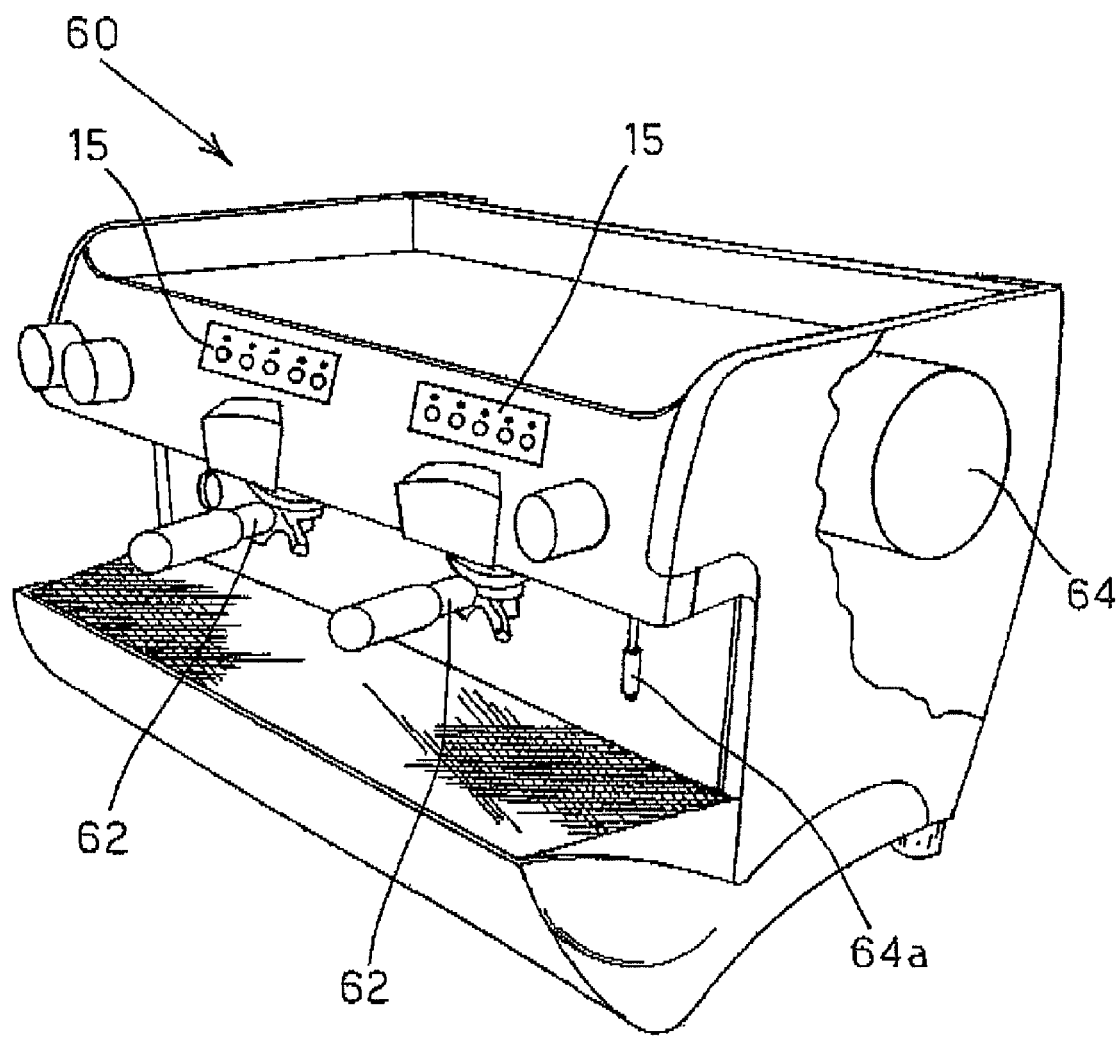
FIG. 1 shows a perspective view of a coffee machine.
Figure 2:
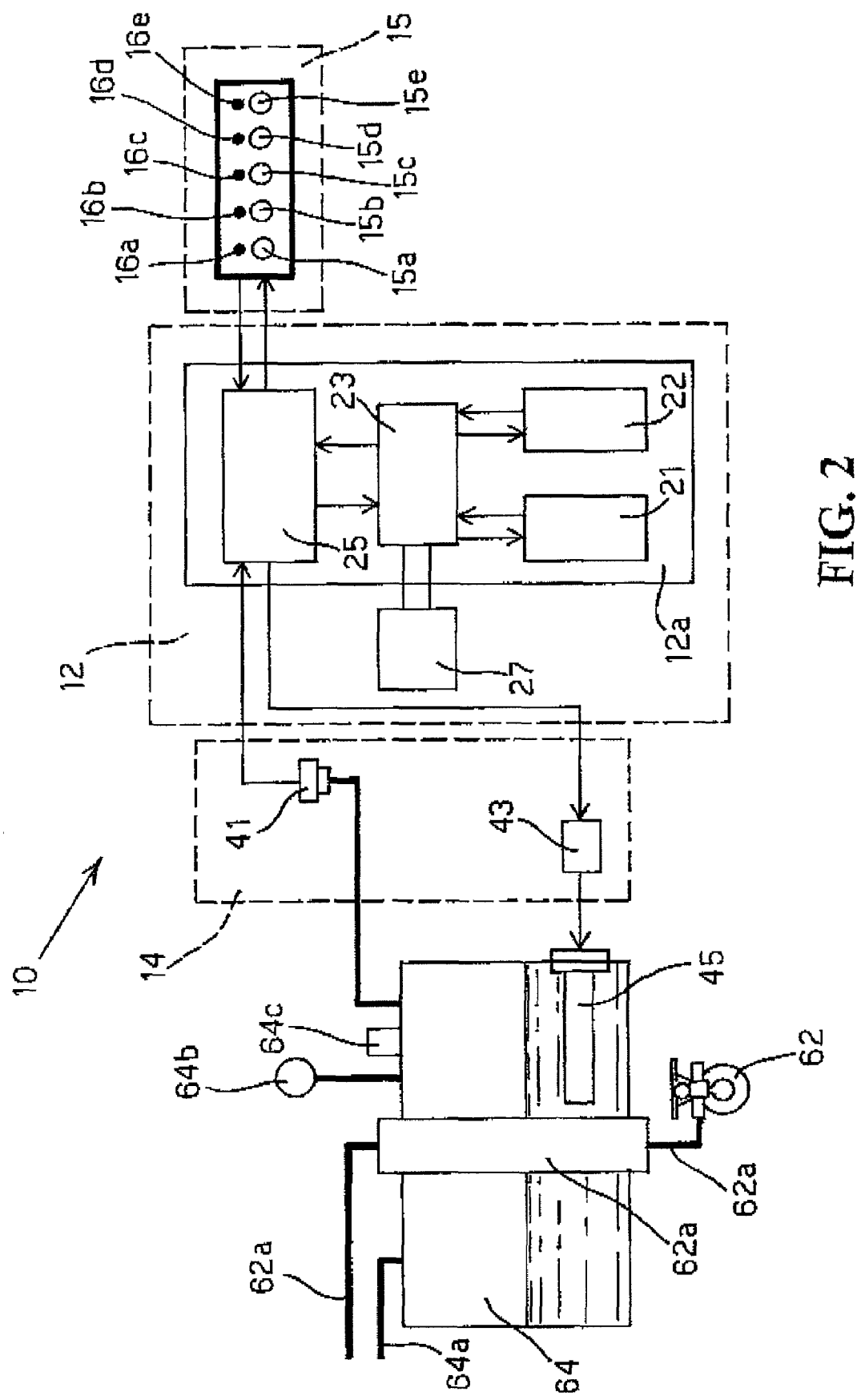
FIG. 2 shows a logic block diagram of the apparatus according to the invention.

With reference to FIGS. 1 and 2 an apparatus for the regulation of operation parameters (apparatus) 10 according to present inventions comprises a control device 12, an operation parameters management device (management device) 14 and at least one commands inputting device or keyboard 15.

The apparatus 10, in the preferred embodiment, is associated to a coffee machine (machine) 60 comprising one or more supplying groups 62, of known type, arranged to supply, for instance, espresso coffee as a result of the activation of a key of the keyboard 15 and a boiler 64, of known type, arranged to maintain under pressure, at a particular temperature, water and steam. Preferably, the boiler 64 is connected to a duct 64a, known per se, for supplying in a controlled way steam under pressure and internally includes an hydraulic circuit 62a, of known type, connected to the supplying groups 62 and arranged to feed water to the supplying groups 62 for supplying coffee. Boiler 64, preferably, is connected to a gauge 64b, known per se, and to a safety valve 64c; the safety valve 64c is arranged to discharge steam in case of pressure in excess in the boiler 64.

The machine 60 in the example is a traditional automatic machine, but, as easily comprehensible to a technician in the field, the machine can be either a traditional semiautomatic machine or a super-automatic machine without departing from the scope of the invention as disclosed and claimed.

The control device 12 of apparatus 10 comprises, for instance, a microprocessor 12a of known type, for instance a microprocessor model MC68HC908GR8 of the Freescale company, and a programmable memory (EEPROM or Electrically-Erasable Programmable Read Only Memory) 27, for instance an EEPROM model 93LC46 of the Microchip company, connected to the microprocessor 12a and configured for storing, for instance, operation parameters such as reference pressure values of the boiler 64 or pressure values set by the operator, as it will be disclosed later on in detail.

The microprocessor 12a comprises, in the preferred embodiment, an interface unit (I/O interface) 25, arranged to exchange analog or digital signals with other devices not shown, in particular with the management device 14 and keyboard 15, a central control unit (CPU) 23 connected to the I/O interface and arranged to manage through the I/O interface 25 the management device 14 and keyboard 15, a read only memory (ROM) arranged to store programs developed during the design phase of the apparatus 10, and a random access memory (RAM), all known per se.

The management device 14 is connected to the boiler 64 and to the control device 12 and comprises, in the preferred embodiment, a pressure sensor 41 and an activation circuit 43, all of known type.

The pressure sensor 41 is connected hydraulically to the boiler and electrically to the I/O interface 25, and is arranged both to detect the pressure inside the boiler 64 and to output, to the CPU 23 through the I/O interface 25, signals indicative of the detected pressure value so that they can be managed by the CPU 23.

For instance the pressure sensor can be a sensor K1 model of the Signal Lux Company, that is responsive to pressure changes of 0.1 BAR and is arranged to supply an output electric voltage indicative of the detected pressure.

The activation circuit 43 is connected to a heating unit 45 associated to the boiler 64 and to the CPU 23 through the I/O interface 25, and is arranged to activate and to deactivate the heating unit 45, on the basis of control signals transmitted from the CPU 23 to the activation circuit 43 itself.

In particular, the activation circuit 43, controlled by the CPU 23, is arranged to activate or to maintain deactivated the heating unit 45 for heating or not heating the water contained into the boiler 64 and, as easily comprehensible to a technician in the field, for consequently raising or lowering the pressure inside the boiler 64.

In the preferred embodiment the heating unit 45 comprises one or more resistors applied, in a known way, to the boiler 64. Preferably, the pressure inside the boiler 64 is changed, under the control of the CPU 23, between 0.6 BAR and 1.4 Bars by steps of 0.1 BAR around a reference pressure of 1 BAR by means, for instance, of commands arranged to activate the heating unit 45 (pressure increase) or commands arranged to maintain deactivated the heating unit 45 (pressure decrease).

In summary, the management device 14 in the described configuration is arranged to manage the pressure inside the boiler 64, by detecting the values of pressure with sensor 41, by transmitting such values to CPU 23 so that it compares them with those stored in the EEPROM 27, and by receiving from the CPU 23 commands arranged to increase or decrease the pressure inside the boiler 64 so as to take it to or maintain it at the value stored in the EEPROM 27 by means of the heating unit (resistors) 45.

Obviously, in other embodiments, the management device can comprise sensors of operation parameters different from the pressure and activation circuits arranged to take or to maintain a particular operation parameter to a predetermined value.

The commands inputting device 15, of known type, for instance a keyboard 9.9.08.91.G model of the Gicar Company having five keys, respectively 15a, 15b, 15c, 15d, 15e, and five LEDs (Light-Emitting Diode), respectively 16a, 16b, 16c, 16d, 16e, is connected, in a known way, to the I/O interface and is arranged to exchange signals with the CPU 23 through the I/O interface 25.

In the exemplary embodiment, each key from 15a to 15e of the commands inputting device (keyboard) 15 is associated to a light emitting element, from 16a to 16e, for instance a LED, arranged to emit light as a result of key-press or activation of the corresponding key by an operator or as a result of commands transmitted by the CPU 23 to the keyboard 15. Preferably the light emitting elements (LED), respectively 16a, 6b, 16c, 16d and 16e are inserted inside respective keys, 15a, 15b, 15c, 15d and 15e, and are integral part of the keyboard, but, in other embodiments they may also be separated from the single keys, located near the keys and be part or not of the keyboard.

Preferably the keys are activated by pressing, but as easily comprehensible to a technician in the field, the keys may be of different type, for instance of capacitive type, and actuatable in different ways, for instance by touch.

According to the preferred embodiment the keyboard 15 is configured for operating at least in two operation modes.

In the first mode of operation or operative mode, the keyboard 15, for instance, is arranged, on the basis of programs developed in the design phase of the machine 60 and stored, for instance, in the ROM 21, to activate the supply of several types of coffee on the basis of the key pressed by the operator;

for instance, if the first key 15a is pressed, espresso coffee of "strong" type is supplied, if the second key 15b is pressed, espresso coffee of "regular" type is supplied, etc.

Preferably, concurrently with the pressing of a key, the corresponding LED lightens.

In the second mode of operation or operation parameters programming mode (programming mode) the keyboard 15, by means of suitable commands activated by means of keys from 15a to 15e, is arranged, on the basis of programs developed during the design phase of machine 60 and stored, for instance, in ROM 21, to allow both to display the operation parameters of machine 60 by means of the selective lightening of LEDs, and to modify and, for instance, store them in EEPROM 27 under the control of CPU 23.

In the programming mode, the modification and storing of parameters are supported, in the various operations, by the selective LED lightening, from 16a to 16e, controlled by CPU 23, so as to make the presence of a display unnecessary and, therefore, to eliminate all the problems already evidenced associated to the presence of the display.

Switching from the operative mode to the programming mode and vice-versa is carried out by pressing one or more predetermined keys, on the basis of programs developed in the design phase of machine 60 and stored, for instance, in ROM 21.

The operation of the apparatus 10 as described above is the following.

Taking as reference the operative mode, in such mode the machine 60 and apparatus 10 operates so as to supply, for instance, "strong", "regular" coffee, etc. depending on the key activated by the operator.

In the operative mode, the CPU 23 measures the pressure inside the boiler 64 on the basis of values detected by the pressure sensor 41 and commands the activation circuit 43 so as to maintain in the boiler a predetermined pressure value, for instance, the value stored in EEPROM 27.

In case of anomalies in the pressure level or in the connected devices, the CPU 23, on the basis of programs developed in the design phase, preferably, carries out predetermined procedures to remove the anomalies.

In case the operator wants to modify one or more operation parameters or values of machine 60, for instance the pressure, the operator proceeds to switch apparatus 10 from operative mode to programming mode, by keeping pressed, for instance, the key 15a for an extended time, for instance more than four seconds.

Such an operation is acknowledged by CPU 23 as a request to switch from operative mode to programming mode and immediately executed.

From this moment and until a subsequent restoration of the operative mode, the machine and the apparatus are in programming mode and the coffee supply is, for instance, blocked.

In the description that follows a plurality of programming steps for setting pressure in a coffee machine are described, by using as reference the table that follows (TAB. 1) in which predetermined meanings are assigned to several keys of the keyboard and to several LEDs.

Obviously, in other embodiments, other meanings may be assigned to the several keys and operation parameters, without departing from the scope of the invention as disclosed and claimed.

TABLE 1

| KEY | LED | STATUS | FUNCTION |
|---|---|---|---|
| 15a (+) |  | pressed | Sets the pressure value by +0.1 steps at each key-press |
|  | 16a | lighted fixed | Indicates a reference pressure |
|  | 16a | lighted flashing with long intervals | Shows the number of steps above the reference pressure |
| 15b (−) |  | pressed | Sets the pressure value by −0.1 steps at each key-press |
|  | 16b | lighted fixed | Indicates a reference pressure |
|  | 16b | lighted flashing with long intervals | Shows the number of steps below the reference pressure |
| 15c |  | pressed | Restores the reference pressure |
|  | 16c |  |  |
| 15d |  |  | Switches the apparatus to operative mode |
|  | 16d | lighted fixed | Shows status switched from programming mode to operative mode |
| 15e |  |  |  |
|  | 16e | lighted flashing | Shows that the set pressure value has not been reached |
|  | 16e | Switched off | Shows that the set pressure value has been reached |

According to the present exemplary embodiment it is provided that in the programming mode the first and second LED, respectively 16a and 16b, signal the pressure level inside the boiler 64.

By taking as reference, for instance, the case in which machine 60 and apparatus 10 are set to operate at the reference pressure, that is 1 BAR (i.e. the value of 1 BAR is stored in EEPROM 27), in such a case the CPU 23, as a result of reading the value of 1 BAR from EEPROM 27, will command through I/O interface 25 to fixedly power on LEDs 16a and 16b.

If the operator wants, in a first phase, to set a new operation value of the pressure, for instance to increase the pressure value, he will press or activate the first key 15a one or more times. Such an operation is immediately managed, through I/O interface 25, by CPU 23, that stores the new pressure value in RAM 22 and, in such a case, by maintaining the LED 16b fixedly powered on, intermittently flashes the LED 16a so that an equal number of flashes of the LED 16a corresponds to the number of pressures of the operator, alternated with a long period of pause, for instance 3 seconds, with the LED 16a being fixedly powered on.

Similarly, if the operator wants, in the first phase, to diminish the value of the pressure, he will press or activate the second key 15b one or more times. Such an operation is immediately managed through I/O interface 25 by CPU 23 that stores the new value of pressure in RAM 22 and, in such a case, by maintaining the LED 16a fixedly powered on, intermittently flashes LED 16b so that an equal number of flashes of LED 16b corresponds to the number of pressures of the operator, alternated with a long period of pause, for instance 3 seconds, with the LED 16a being fixedly powered on.

Obviously, if by switching from operative mode to programming mode, the set pressure is different from the reference pressure, CPU 23 will manage to fixedly power on one of the two LEDs and to flash the other with a number of flashes equal to the value diminished or increased with respect to the reference value, alternated with a long period of pause, for instance 3 seconds, with one of the two LEDs, 16a or 16b, being fixedly powered on.

Once the setting phase is completed, the operator can proceed, in a second phase, to save the setting by pressing, for instance, the fourth key 15d that transmits a corresponding signal to save parameters and switch to the operative mode.

In particular, as a result of such an operation, CPU 23, under the control of the programs developed during the design phase, stores in EEPROM 27 the new pressure value set, previously stored in RAM 22, and starts the control procedures arranged to bring the pressure of boiler 64 to the new value set.

Both in the operative and programming modes, during the period in which the value set by the operator does not correspond to the value measured by CPU 23 through the pressure sensor 41, CPU 23 sends to the management device 14 commands arranged to raise or to lower the pressure inside the boiler 64 so as to reach the set value.

Preferably, during the programming mode, CPU 23 commands also, during the period in which the value set by the operator does not correspond to the measured value, flashing of LED 16e until the set pressure is reached inside the boiler 64. LED 16e powered off is indicative, in such a case, of the fact that the boiler 64 has reached the set pressure.

The apparatus, in the preferred embodiment has a keyboard that operates both in the operative and programming modes.

According to further embodiments, it is provided that all the keyboards present on the machine operate both in the operative and programming modes.

In still other embodiments it is provided that a keyboard and a boiler are associated to every supplying group and that each keyboard works in the operative and programming modes for the respective boiler.

In such a configuration the control device can be a single one and selectively usable for each associated keyboard and boiler or it can be replicated for each keyboard and boiler.

In the description reference has made to light emitting elements for highlighting, for instance, operation parameters of the machine.

In a further embodiment it is provided that the light emitting elements are replaced by elements emitting sound at different frequencies and that elements emitting sound at different frequencies are associated to the keys of the commands inputting device.

According to such a further embodiment the sound emitter elements may perform the same functions of LEDs by emitting uninterrupted or intermittent sounds instead of fixed or flashing light.

In summary, thanks to present invention, by means of the described apparatus the operator can set operation parameters of the coffee machine, such as pressure, by simply using one keyboard and, preferably, a plurality of LEDs, which are generally present in any case, without the necessity of providing a numeric or alphanumeric display on the machine. The proposed solution does not require to store messages in a plurality of languages and therefore it requires control devices having smaller memory and therefore being simpler and less expensive.

Obvious changes and/or variations to the above disclosure are possible, as regards dimensions, shapes, materials, components, circuit elements, connections and contacts, as well as details of circuitry, of the described construction and operation method without departing from the scope of the invention as defined by the claims that follow.

The invention claimed is:

1. Apparatus for the regulation of operation parameters, in particular pressure, in a coffee machine, comprising:
   a commands inputting device arranged for commanding operation of said machine during an operative mode and for setting operation parameters chosen among a plurality of operation parameters during an operative parameters programming mode;
   a control device having memory means, said control device connected to said commands inputting device and arranged, during said parameters programming mode, to store said parameters in said memory means;
   wherein said commands inputting device comprises a plurality of keys alternatively arranged
      to activate the supply of different types of coffee during said operative mode;
      to modify and store values of said operation parameters during said parameters programming mode; and
      to command switching from said operative mode to said parameters programming mode and vice-versa; and
   wherein said apparatus comprises
   a plurality of light or sound emitting elements connected to said control device, that, during said parameters programming mode are actuatable by said control device to emit light or sound at different frequency, respectively, according to configurations having each a predetermined meaning to signal during said parameters programming mode a corresponding value of the operation parameter chosen among a plurality of operation parameters and inputted through said commands inputting device set by said keys.

2. Apparatus according to claim 1, further comprising:
   a management device having at least one sensor arranged to detect a particular value of the operation parameter in said machine and activation means configured for activating devices adapted to manage said value of the operation parameter in said machine;
   wherein said control device is connected to said management device and is configured for measuring said particular value of the operation parameter, comparing said particular value of the operation parameter with said value of the operation parameter chosen among a plurality of values of the operation parameters and commanding said activation means to regulate said particular value of the operation parameter in said machine as a function of said value of the operation parameter chosen among a plurality of values of the operation parameters.

3. Apparatus according to claim 1, wherein said predetermined configurations comprise the fixed activation of at least one first emitter element and the fixed or intermittent activation of at least one second emitter element.

4. Apparatus according to claim 2, wherein said control device is configured for:
   activating said management device to regulate said particular operation parameter in said machine as a function of said operation parameter chosen among a plurality of operation parameters;
   activating at least one emitter element during activation of said activation means.

5. Apparatus according to claim 1, wherein the setting of values of the operation parameters chosen among a plurality of operation parameters is realised by at least one first key configured for diminishing said value of the operation parameter and at least one second key configured for increasing said value of the operation parameter, said first key and said second key, respectively, being arranged to store said value of the operation parameter in said memory means.

6. Apparatus according to any one of claim 1, wherein said values of the operation parameters are operation pressure values in said machine.

7. Apparatus according to claim 2, wherein said control device comprises:
at least one microprocessor circuit comprising program means configured for controlling said keys and said plurality of emitting elements.

8. Coffee machine comprising at least one supplying group for supplying coffee and at least one boiler connected to the supplying group, wherein the machine comprises an apparatus for the regulation of operation parameters as claimed in claim 1.

9. Operating method of an apparatus for the regulation of operation parameters, in particular pressure, in a coffee machine comprising a plurality of keys, the method, comprising the steps of:
inputting, by using at least one key of said keys, commands for alternatively switching from an operative mode wherein said keys are arranged for commanding operation of said machine, to a programming mode wherein said keys are arranged for setting values of one operation parameter chosen among a plurality of operation parameters;
activating during said operative mode the supply of different types of coffee with said keys;
modifying and storing during said programming mode values of said operation parameters with said keys;
activating, by a control device, a plurality of light or sound emitting elements to emit light or sound at a different frequency, respectively, to signal during said programming mode, according to configurations having each a predetermined meaning, a corresponding value of the operation parameter set by said plurality of keys.

10. Method according to claim 9, further comprising the steps of:
comparing, using said control device, said stored value of the operation parameter with a particular value of the operation parameter detected by at least one sensor;
regulating, using activation means controlled by said control device, said particular value of the operation parameter in said machine as a function of said stored value of the operation parameter.

11. Method according to claim 10, wherein said step of regulating, using said activation means controlled by said control device, said particular value of the operation parameter in said machine comprises the steps of:
activating regulation of said particular value of the operation parameter in said machine as a function of said stored value of the operation parameter;
activating in intermittent way at least one emitter element during said step of activating regulation.

12. Method according to claim 9, wherein said step of setting values of the operation parameters chosen among a plurality of values of the operation parameters comprises the step of:
activating in fixed way at least one first emitter element and in fixed or intermittent way at least one second emitter element.

13. Method according to claim 9, wherein said step of setting values of the operation parameter chosen among a plurality of values of the operation parameters comprises the step of:
setting an operation pressure value in said machine.

14. Computer program product or set of computer program products directly loadable in the internal memory of at least one electronic computer and comprising software code portions arranged to perform, when the product is run on at least one electronic computer, the method according to claim 9.

* * * * *